2,759,790
PURIFICATION OF MATERIALS CONTAINING FLUORIDES

Louis Spiegler, Woodbury, N. J., assignor to the United States of America as represented by the United States Atomic Energy Commission No Drawing. Application January 30, 1945, Serial No. 575,353

2 Claims. (Cl. 23—14.5)

This invention relates to the purification of uranium compounds and is particularly concerned with the removal of fluorine from uranium compounds.

In the working up of uranium-containing by-product materials to recover the valuable uranium content, uranium compounds contaminated with substantial proportions of fluorine in the form of metal fluorides are obtained. For certain uses of these uranium compounds the presence of fluorine is objectionable.

The present invention has for an object the production of uranium compounds free from fluorine or having a very low fluorine content. A further object of the invention is the production of the black oxide of uranium, $U_3O_8$, free from metal fluorides. A still further object is the production of the black oxide from uranium peroxide containing substantial proportions of fluorine.

In accordance with the invention, a uranium compound contaminated with fluorides is heated with a peroxide to a temperature above 350° C. to expel the fluorine as a volatile fluorine oxide.

The process may be carried out by mixing the uranium compound with a metal peroxide. Thus a black oxide containing fluorine may be mixed with uranium peroxide or another metal peroxide, such as an alkali-metal peroxide, an alkaline earth metal peroxide, or lead peroxide, and the mixture may be heated to expel the fluorine in volatile form. It is desirable that the ratio of peroxide to fluorine suffice to liberate a large excess of oxygen over the ratio in $F_2O$ in order to eliminate the last traces of fluorine.

Since the use of any metal peroxide other than uranium peroxide entails contamination of the uranium product with the other metal, it is preferred to employ uranium peroxide for converting the fluorine to the volatile fluorine oxide.

In my U. S. patent application Serial No. 559,665, entitled Separation of Uranium from Mixtures, filed October 20, 1944, a process for the isolation of uranium is described involving precipitation of uranium peroxide from acidic uranyl sulfate solutions. In the manufacture of such solutions from materials containing fluorine, the uranium peroxide product is frequently contaminated with a small proportion of fluorine present as magnesium fluoride or perhaps a mixed fluoride of two or more metals. The fluoride impurities present in the product may be eliminated according to the present invention by heating the uranium peroxide product to a temperature above 350° C., preferably to a temperature between 500° C. and 1000° C. The uranium peroxide decomposes to black oxide when heated in this manner and the liberated oxygen is available to react with the metal fluorides to form fluorine oxide, which is liberated in gaseous form.

By the process of the invention it has been possible to produce, from fluorine-containing uranium compounds, uranium oxide containing from a few hundredths of one per cent to undetectable quantities of fluorine, depending upon the ratio of peroxide to fluorine and the temperature and duration of heating.

The following examples illustrate the process of the invention.

Example 1

Six samples of uranium peroxide containing from 1.1% to 3.0% of fluorine present as magnesium fluoride were heated in air for two hours at 850° C. This heating converted the uranium peroxide to black oxide. The fluorine contents of the uranium peroxide and the black oxide product are given in the following table.

| Sample No. | Percent F by weight in $UO_4.2H_2O$ | Percent F by weight in $U_3O_8$ |
|---|---|---|
| 1 | 1.1 | 0.04 |
| 2 | 1.1 | 0.00 |
| 3 | 1.5 | 0.00 |
| 4 | 1.5 | 0.00 |
| 5 | 3.0 | 0.00 |
| 6 | 4.8 | 1.5 |

Each of the uranium peroxide samples was prepared from materials obtained by a process involving the step of calcining by-product uranium-bearing substances in air at temperatures between 800° C. and 1000° C. No fluorine-containing material was added after this calcination treatment, which was conducted in the absence of a peroxide. Thus it is evident that heating in air was not adequate to convert the fluorine present to volatile form.

Example 2

A uranium peroxide product obtained in the same manner as the samples treated in Example 1 contained a weight ratio of fluorine to uranium of 0.0061. This product was heated at 800° C. for ½ hour. The uranium peroxide was converted in this period to black oxide in which the weight ratio of fluorine to uranium was 0.0009.

It will be understood that I intend to include variations and modifications of the invention and that the preceding examples are illustrations only and in no wise to be construed as limitations upon the invention, the scope of which is defined in the appended claims, wherein:

I claim:
1. The method of reducing the fluorine content of a uranium oxide which is contaminated with magnesium fluoride impurities which comprises heating the uranium oxide containing said impurities with uranium peroxide in the absence of other added reagents to a temperature between 500° C. and 1000° C. for a sufficient period of time to expel a major part of the fluorine as a volatile product.

2. The method of producing a uranium oxide of low fluorine content from precipitated uranium peroxide which is contaminated with magnesium fluoride which comprises heating said contaminated uranium peroxide in the absence of added reagents to a temperature between 500° C. and 1000° C. for a sufficient period of time to expel a major part of the fluorine as a volatile product.

References Cited in the file of this patent

UNITED STATES PATENTS

| | | |
|---|---|---|
| 1,634,870 | Gerngross | July 5, 1927 |
| 1,902,832 | Caldwell | Mar. 28, 1933 |
| 1,994,070 | Foss | Mar. 12, 1935 |

OTHER REFERENCES

Mellor, "Inorganic and Theoretical Chemistry," vol. 2, p. 11, Longmans, London (1932).

Friend, Textbook of Inorganic Chemistry, vol. 7, part 3, p. 311, published in 1926 by Charles Griffin and Co., London.